(12) United States Patent
Nishio et al.

(10) Patent No.: US 6,238,769 B1
(45) Date of Patent: May 29, 2001

(54) WINDOW MOLDING FOR A VEHICLE

(75) Inventors: Hirochika Nishio, Aichi-ken; Norikazu Iida, Anjo, both of (JP); Katsuhiko Takeuchi, Seymour, IN (US); Masanori Kawano, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/266,752

(22) Filed: Mar. 12, 1999

(30) Foreign Application Priority Data

Mar. 12, 1998 (JP) .................................................. 10-060945

(51) Int. Cl.[7] ....................................................... B60J 1/02
(52) U.S. Cl. .......................... 428/120; 49/490.1; 296/93; 428/31; 428/122; 428/192; 428/358
(58) Field of Search ..................................... 428/120, 122, 428/358, 192, 31; 49/490.1; 296/93

(56) References Cited

U.S. PATENT DOCUMENTS 4,477,507 * 10/1984 Kunert .................................. 428/122
4,880,674 * 11/1989 Shimizu ............................... 428/122
4,982,529 * 1/1991 Mesnel ................................ 428/122

FOREIGN PATENT DOCUMENTS 61-222812   10/1986 (JP) .
10-53024    2/1998 (JP) .

* cited by examiner

*Primary Examiner*—Nasser Ahmad
(74) *Attorney, Agent, or Firm*—Oblon, Spivak, McClelland, Maier & Neustadt, P.C.

(57) ABSTRACT

A window molding for a vehicle includes a leg portion arranged between an outer peripheral surface of the windshield and the body panel and having an opposite surface faced to the outer peripheral surface of the windshield, a head portion integrally formed on the leg portion and having a contacting surface contacted to an outer surface of the windshield, an engaging portion integrally formed on the leg portion and contacted to an inner surface of the windshield, a lip portion integrally formed on the leg portion or the head portion and contacted to the body panel, and a core member buried into part of the head portion disposed along the corner portion of the edge of the windshield, which is located outside of the outer peripheral surface of the windshield, and extended in the longitudinal direction of the head portion.

2 Claims, 4 Drawing Sheets

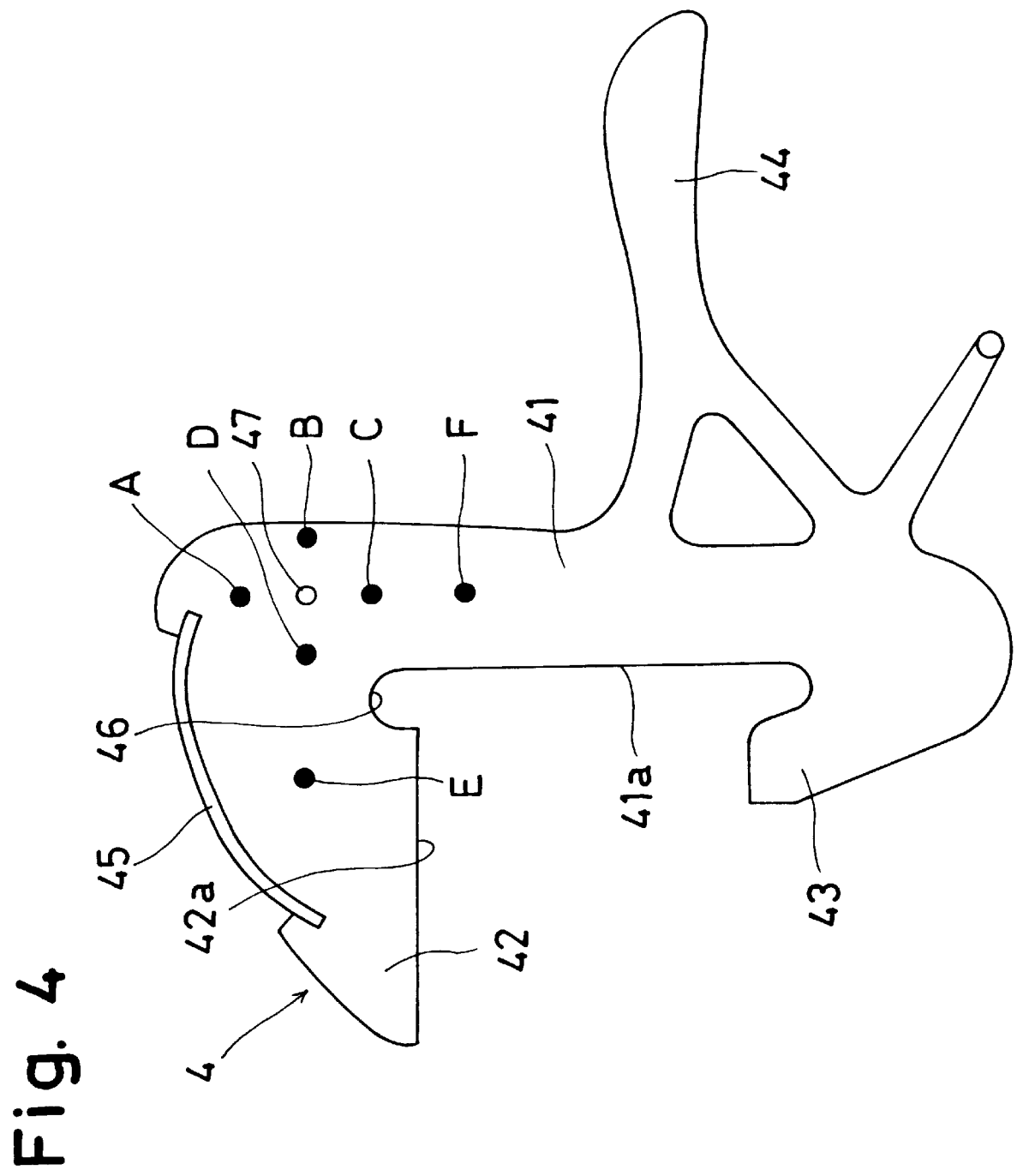

WINDOW MOLDING FOR A VEHICLE

BACKGROUND OF THE INVENTION

Field of the Invention

The present invention generally relates to a window molding for a vehicle, and more particularly to a window molding adapted to be mounted on an edge of a vehicle's windshield having at least one of the corner portion in order to seal between the windshield and a body panel of the vehicle.

BACKGROUND OF THE INVENTION

A conventional window molding for a vehicle of this kind is disclosed, for example, in Japanese Patent laid-open publication No. 61(1986)-222812.

This window molding includes a leg portion, a head portion, an engaging portion and a lip portion. The leg portion is arranged between an outer peripheral surface of a windshield and a body panel of a vehicle exclusive of the outer peripheral surface of a lower portion of the windshield. The leg portion has an opposite surface which is opposite to the outer peripheral surface of the windshield. The head portion is integrally formed on the leg portion which is contacted to an outer surface of an edge of the windshield. The engaging portion is integrally formed on the leg portion. The engaging portion is contacted to an inner surface of the edge of the windshield. Thereby, the edge of the windshield is sandwiched between the head portion and the engaging portion. As a result, the window molding is mounted on the windshield along an upper portion, two side portions and two corner portions of the edge of the windshield. The lip portion is integrally formed on the leg portion. The lip portion is contacted to the body panel. Thereby, the window molding seals between the windshield and the body panel. The thickness of one part of the head portion which is disposed along the corner portions is gradually increased relative to that of the other part of the head portion disposed along the upper and side portions.

In general, the window molding is mounted on the edge of the windshield while bending itself along the edge of the windshield. Therefore, a force which makes a top end of the part of the head portion disposed along the corner portions separate from the outer surface of the windshield is generated and acts on the window molding. In the above mentioned prior window molding, since the thickness of the part of the head portion disposed along the corner portions is increased, it is possible to resist the above force and therefore it is possible to prevent the head portion from separating from the outer surface of the windshield. However, the gradually changing of the thickness of the head portion requires complicated forming for the window molding and therefore the manufacturing cost of the window molding is increased.

SUMMARY OF THE INVENTION

A need exists, therefore, for a window molding which addresses at least the forgoing drawbacks of the prior art.

According to the present invention, the window molding for a vehicle includes a leg portion arranged between an outer peripheral surface of a windshield and a body panel and having an opposite surface faced to the outer peripheral surface of the windshield, a head portion integrally formed on the leg portion and having an contacting surface contacted to an outer surface of an edge of the windshield, an engaging portion integrally formed on the leg portion and contacted to an inner surface of the edge of the windshield, a lip portion integrally formed on the leg portion or the head portion and contacted to the body panel, and a core member buried into part of the head portion which is located outside of the outer peripheral surface of the windshield, and extended in the longitudinal direction of the head portion.

BRIEF DESCRIPTION OF THE DRAWING FIGURES

The foregoing and additional features of the present invention will become more apparent from the following detailed description of a preferred embodiment thereof when considered with reference to the attached drawings, in which FIG. 1 is a perspective view of a front side of a vehicle having a window molding according to the present invention;

FIG. 4 is a cross-sectional view of a location of a core member of a window molding according to the present invention.

DETAILED DESCRIPTION OF THE PREFERRED EMBODIMENT

Hereinafter a window molding for vehicle according to an embodiment of the present invention is explained with reference to FIGS. 1 through 4.

Figure 1:
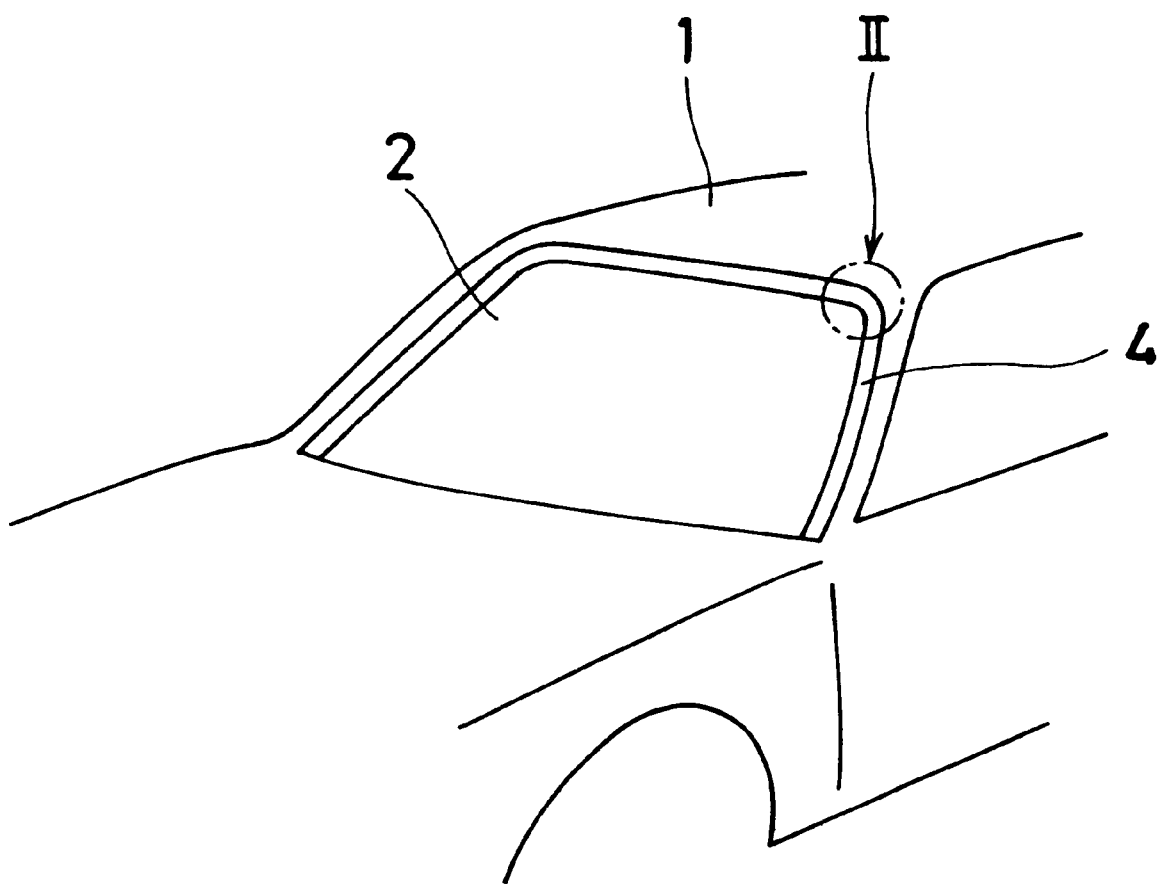
Figure 2:
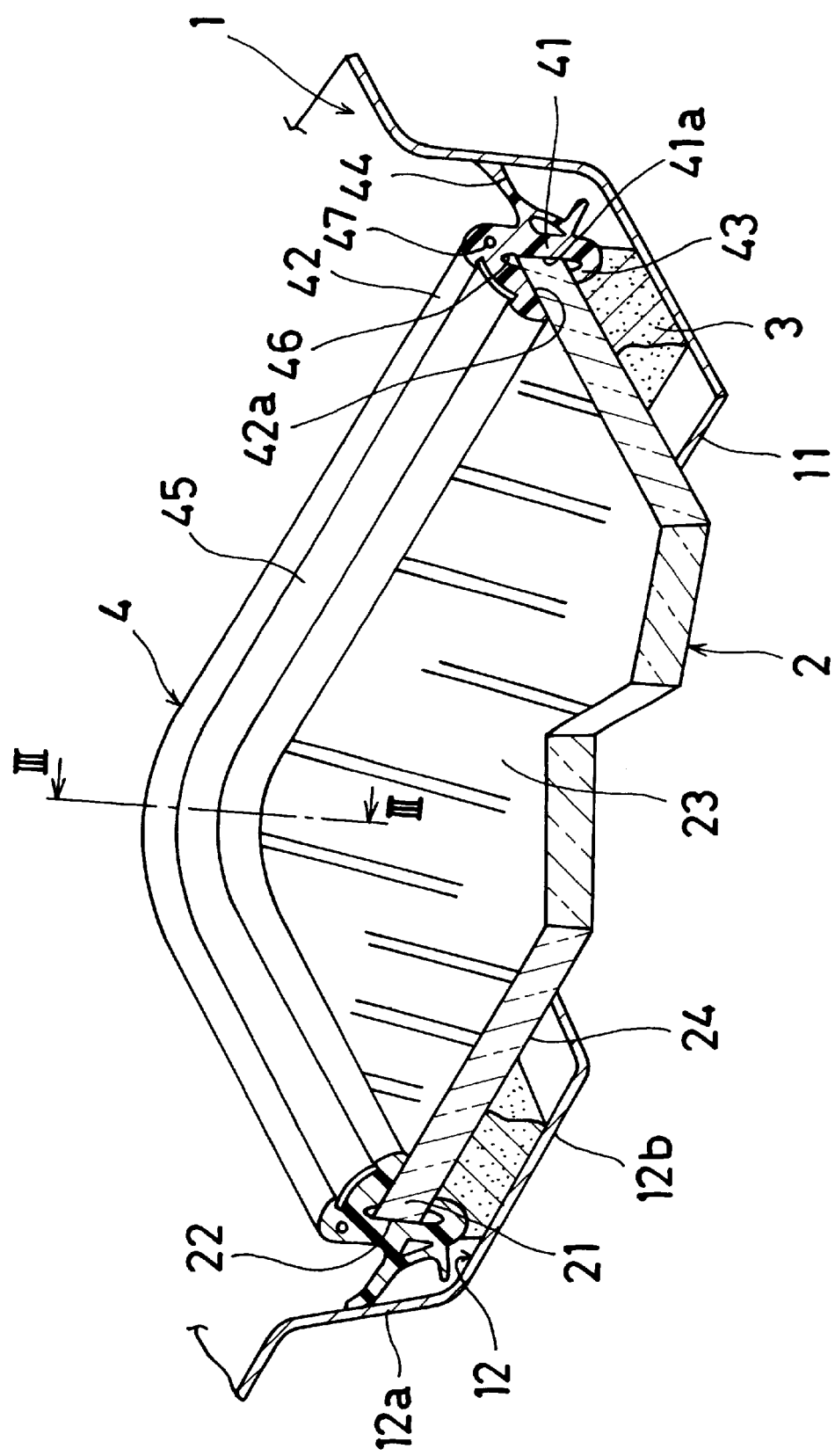
FIG. 2 is a fragmentary perspective view of a portion II in FIG. 1.
Figure 3:
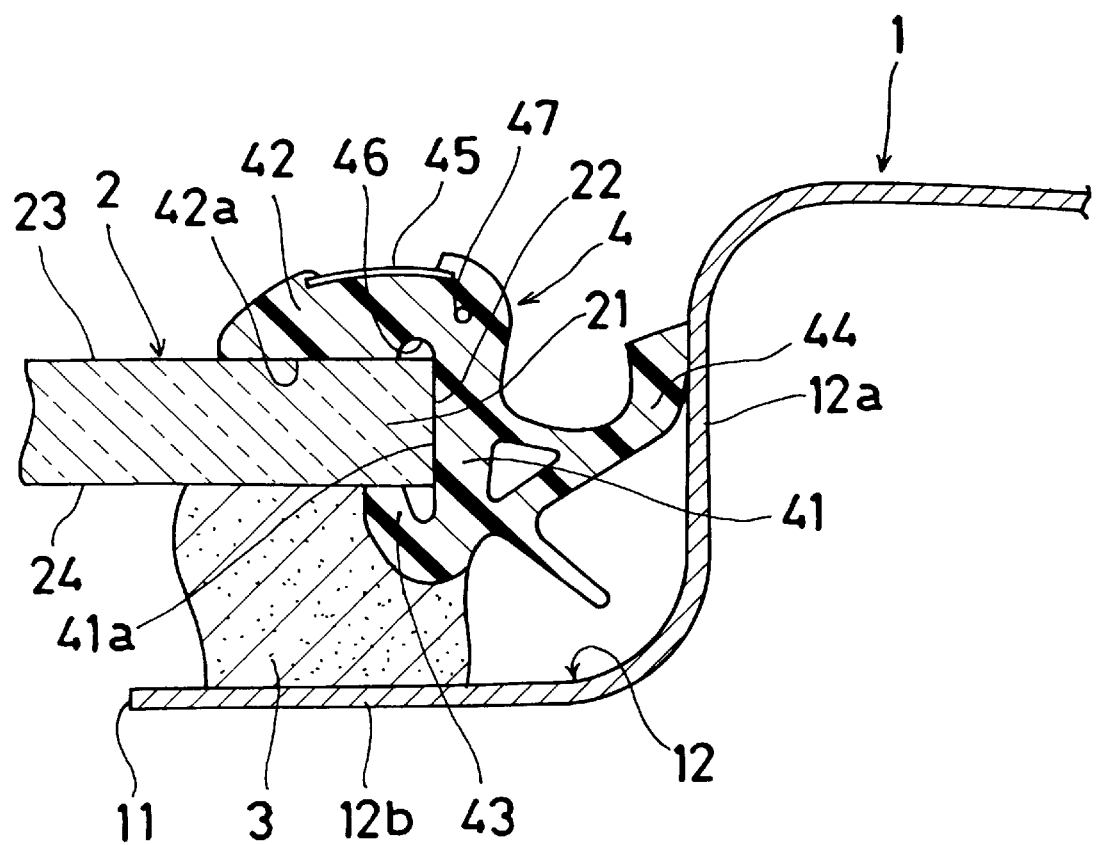
FIG. 3 is a cross-sectional view taken along line III—III in FIG. 2.

As shown in FIGS. 1, 2 and 3, a windshield 2 is mounted on a body panel 1 so as to close a front opening 11 which is formed in a stepped portion 12 of the body panel 1. The stepped portion 12 has a vertical wall 12a and a horizontal wall 12b. The windshield 2 is fixed to the horizontal wall 12b of the stepped portion 12 of the body panel 1 at its an edge 21 of the windshield 2 by a bonded material 3. An outer peripheral surface 22 of the windshield 2 is opposite to the vertical wall 12a of the stepped portion 12 of the body panel 1 with a predetermined gap therebetween. A window molding 4 is provided so as to adapt to be mounted on the edge 21 of the windshield 2. The window molding 4 is mounted on the windshield 2 along an upper edge portion, two corner edge portions and two side edge portions of the edge 21 of the window shield 2.

The window molding 4 is made of thermoplastic resin material. The window molding 4 is integrally elongated along the upper edge portion, the corner edge portions and the side edge portions of the edge 21 of the windshield 2. A cross-sectional shape of the window molding 4 is same along the longitudinal direction thereof. The window molding 4 includes leg portion 41, a head portion 42, an engaging portion 43, a lip portion 44 and a core member 47. The leg portion 41 is arranged between an outer peripheral surface 22 of the windshield 2 and the vertical wall 12a of the stepped portion 12 of the body panel 1. The leg portion 41 has an opposite surface 41a which is contacted to the outer peripheral surface 22 of the windshield 2. The head portion 42 is integrally formed on the leg portion 41. The head portion 42 has a contacting surface 42a. The contacting surface 42a is elastically contacted to an outer surface 23 of the edge 21 of the windshield 2 and is nearly vertically connected to the opposite surface 41a. A groove 46 is formed on a connecting portion of the contacting surface 42a of the head portion 42 which is connected to the opposite surface 41a. The groove 46 extends in the longitudinal direction of the window molding 4. The engaging portion 43 is integrally formed to the leg portion 41. The engaging portion 43 is elastically contacted to an inner surface 24 of the windshield 2. Therefore, the windshield 2 is elastically sandwiched between the head portion 42 and the engaging portion 43. As a result, the window molding 4 is elastically mounted on the edge 21 of the windshield 2. The lip portion 44 is integrally formed on the leg portion 41. The lip portion 44 is contacted to the vertical wall 12a of the stepped portion 12 of the body panel 1. Therefore, the window molding 4 seals between the windshield 2 and the body panel 1. The core member 47 is made of a metal wire or a resin plate which is harder than the head portion 42. The core member 47 is buried into the head portion 42 along the longitudinal direction of the window molding 4. A design plate 45 which is extended along the longitudinal direction of the window molding 4 is mounted on the head portion 42. The design plate 45 is made of metal plate or resin film.

The core member 47 is located outside of the outer peripheral surface 22 of the windshield 2 (i.e. at a side of the vertical wall 12a of the stepped portion 12 of the body panel 1 with respect to the outer peripheral surface 22 of the windshield 2) and at a side of an exterior with respect to the outer surface 23 of the windshield 2 (i.e. at a side of the design plate 45 with respect to the groove 46).

When the window molding 4 is mounted on the windshield 2 while bending it along the edge 21, part of the contacting surface 42a of the head portion 41 which is disposed along the corner portion of the edge 21 is strongly biased against the outer surface 23 of the edge of the windshield 2 by the core member 47. At this time, since the core member 47 is bent along the corner portion of the edge 21 of the windshield 2, the core member 47 imparts to the head portion 41, a force biasing the contacting surface 42a disposed along the corner portion of the edge 21 to contact the outer surface 23. Further, since the groove 46 is formed on the contacting surface 42a as mentioned above, the head portion 41 is brought down toward the outer surface 23 while the groove 46 functions as a fulcrum. Accordingly, the part of the contacting surface 42a of the head portion 41 which is disposed along the corner portion of the edge 21 is strongly contacted to the outer surface 23 by the restoring force of the core member 47. Thereby, the core member 47 prevents the head portion 42 from separating from the outer surface 23 of the edge of the windshield 2.

The inventors of the present invention investigated a relationship between a location of the core member 47 and a separation degree. The separation degree is an amount which the part of the head portion 42 disposed along the corner portion of the edge 21 is separated from the outer surface 22 of the windshield 2 at the mounting. Referring to FIG. 4, the resulting separation degrees when core member 47 is located at the points A, B, C and D, respectively, are smaller than the resulting separation degrees at the points E and F, respectively. Also, the separation degree at the points A and B are smaller than the separation degree points C and D. Namely, the farther core member 42 separates from the outer peripheral surface 22 of the windshield 2 toward the vertical wall 12a of the stepped portion 12 of the body panel 1 and the outer surface 23 of the windshield 2 toward the exterior, the core member 47 can more surely prevent the head portion 42 from separating from the outer surface 23 of the windshield 2.

The principles, preferred embodiment described herein is therefore illustrative and not restrictive, the scope of the invention being indicated in the appended claims and allf variations which come within the meaning of the claims are intended be embraced therein.

What is claimed as new and desired to be secured by Letters Patent of the United States:

1. A window molding adapted to be mounted on an edge of a vehicle windshield having at least one corner portion and for sealing between the windshield and a body panel of the vehicle, said window molding comprising:

a leg portion arranged between an outer peripheral surface of the windshield and the body panel and having an opposite surface faced to the outer peripheral surface of the windshield;

a head portion integrally formed on the leg portion and having a contacting surface contacted to an outer surface of the edge of the windshield;

an engaging portion integrally formed on the leg portion and contacted to an inner surface of the edge of the windshield;

a lip portion integrally formed on the leg portion or the head portion and contacted to the body panel;

a groove portion formed on a connecting portion of the contacting surface of the head portion which is connected to the opposite surface of the leg portion so as to reduce a thickness of the head portion; and a core member buried into part of the head portion which is located outside of the outer peripheral surface of the windshield and exterior of the outer surface of the edge of the windshield with respect to the groove portion, and extended in the longitudinal direction of the head portion.

2. The window molding according to claim 1, wherein the core member is located at a side of the body panel with respect to the outer peripheral surface of the windshield so that the contacting surface of the part of the head portion disposed along the corner portion of the edge of the windshield is strongly contacted to the outer surface of the windshield.

* * * * *